United States Patent
Wakabayashi et al.

(10) Patent No.: US 6,686,992 B2
(45) Date of Patent: Feb. 3, 2004

(54) RAINDROP DETECTING METHOD AND APPARATUS HAVING TEMPERATURE-DEPENDENT CHARACTERISTIC COMPENSATION

(75) Inventors: Shinji Wakabayashi, Anjo (JP); Junichi Ishikawa, Takahama (JP); Akira Kurahashi, Nukata-gun (JP); Osamu Terakura, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/860,641

(22) Filed: May 21, 2001

(65) Prior Publication Data

US 2001/0050766 A1 Dec. 13, 2001

(30) Foreign Application Priority Data

Jun. 9, 2000 (JP) ......................................... 2000-173340

(51) Int. Cl.[7] .............................................. G01N 15/06
(52) U.S. Cl. ......................................... 356/72; 250/573
(58) Field of Search ........................... 356/72, 73, 335, 356/336, 337; 250/573–575, 214 R, 227.25, 205, 208.1, 564, 565

(56) References Cited

U.S. PATENT DOCUMENTS

| 4,595,866 A | 6/1986 | Fukatsu et al. |
| 4,867,561 A | 9/1989 | Fujii et al. |
| 5,059,877 A | 10/1991 | Teder |
| 5,386,111 A * | 1/1995 | Zimmerman ........... 250/227.25 |
| 6,175,205 B1 * | 1/2001 | Michenfelder et al. ..... 318/444 |
| 6,397,161 B1 * | 5/2002 | Tanaka et al. ............... 702/134 |

FOREIGN PATENT DOCUMENTS

| JP | 57-186556 | 11/1982 |
| JP | 59-100034 | 6/1984 |
| JP | 61-122799 | 6/1986 |
| JP | 61-119467 | 7/1986 |
| JP | 11-326186 | 11/1999 |
| WO | WO 98/451148 | 10/1998 |

* cited by examiner

Primary Examiner—Kevin Pvo
Assistant Examiner—Seung C. Sohn
(74) Attorney, Agent, or Firm—Nixon & Vanderhye P.C.

(57) ABSTRACT

A raindrop detecting apparatus has a temperature sensor, an EEPROM, a processor and a raindrop sensor. A temperature characteristic data is defined by a first temperature data of the temperature sensor and a first output data of the raindrop sensor produced at a first temperature condition, and stored in the EEPROM. The processor updates a raindrop detection threshold by using the stored characteristic data, a second temperature data and a second output data produced at a second temperature, when an engine is started under no-raindrop condition. The processor compares an output data of the raindrop sensor with the raindrop detection threshold to detect a raindrop, while converting at least one of the characteristic data and the output data in correspondence with a temperature data produced at a raindrop detection time.

31 Claims, 4 Drawing Sheets

RAINDROP DETECTING METHOD AND APPARATUS HAVING TEMPERATURE-DEPENDENT CHARACTERISTIC COMPENSATION

CROSS REFERENCE TO RELATED APPLICATION

This application is based on and incorporates herein by reference Japanese Patent Application No. 2000-173340 filed Jun. 9, 2000.

BACKGROUND OF THE INVENTION

The present invention relates to a raindrop detecting method and apparatus that compensate for temperature-dependent output variations.

A conventional raindrop detecting apparatus detects raindrops by emitting a light from a light emitting device and receiving a reflected light by a light receiving device, because the reflected light varies with raindrops. The light emitting level of the light emitting device and the output signal level of the light receiving device change with ambient temperature. As a result, the relation between the raindrop and the output signal level of the light receiving device varies with ambient temperature, thus causing error in the raindrop detection.

JP-A-11-326186 proposes to compensate for this temperature-dependent detection output variation by adjusting the gain of an amplifier used in the light receiving device. However this adjustment is not satisfactory, because it is made uniformly or evenly to a plurality of apparatus units of the same type, when the amplifier is assembled in a raindrop detecting apparatus.

SUMMARY OF THE INVENTION

It is an object of the present invention to provide a raindrop detecting method and apparatus, which is capable of compensating for detection output variations from unit to unit even after manufacture of the apparatus.

According to the present invention, a raindrop detecting apparatus has a raindrop sensor, a temperature sensor, a processor and an EEPROM. A temperature characteristic data is defined by a first temperature data of the temperature sensor and a first output data of the raindrop sensor produced at a first temperature condition, and stored in the EEPROM. The processor calculates a raindrop detection threshold and compares an output data of the raindrop sensor with the raindrop detection threshold to detect a raindrop, while converting at least one of the characteristic data and the output data in correspondence with a temperature data produced at a raindrop detection time.

Preferably the characteristic data is defined and stored before the apparatus is installed in a vehicle. The processor updates the raindrop detection threshold by using the stored characteristic data, a second temperature data and a second output data produced at a second temperature condition, when an engine is started under no-raindrop condition.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in further detail with reference to an embodiment, in which a raindrop detecting apparatus is applied to a windshield wiper drive system for an automotive vehicle and detects raindrops based on light reflection. This apparatus may also be applied to windshield wiper systems for airplanes and ships, as well as window closing/opening drive systems for vehicles, ships, airplanes, buildings and houses.

Figure 1:
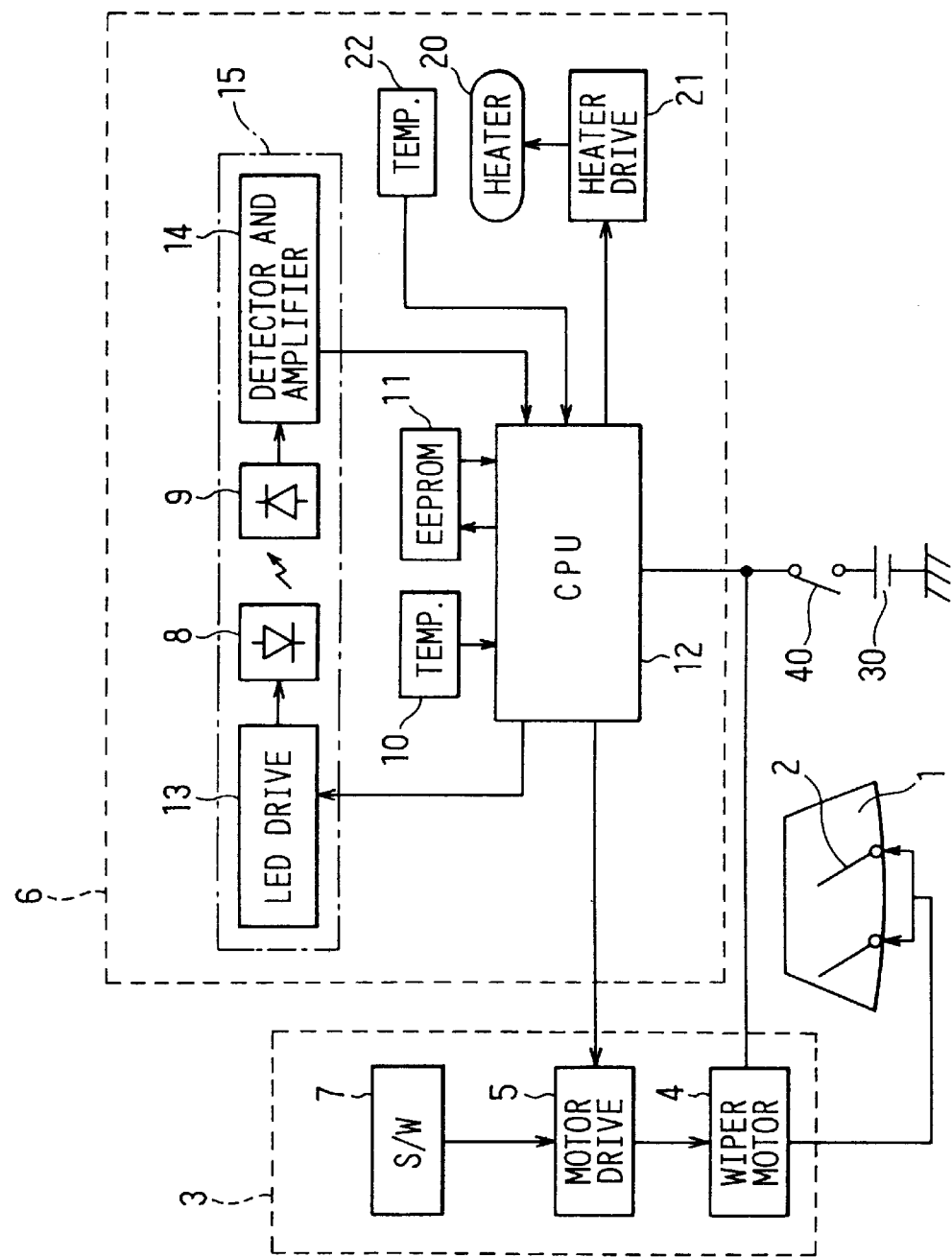
FIG. 1 is a block diagram showing a raindrop detecting apparatus according to an embodiment of the present invention.

Referring first to FIG. 1, a windshield wiper system for a vehicle has a windshield 1, wiper blades 2, a wiper drive apparatus 3. The wiper drive apparatus 3 is comprised of a wiper motor 4, a wiper motor drive circuit 5 and a wiper switch (S/W) 7 to wipe out raindrops on the windshield 1 when driven with electric power supplied from a battery 30 through an ignition switch 40. The wiper drive apparatus 3 is connected to a raindrop detecting apparatus 6. The raindrop detecting apparatus 6 has a central processing unit (CPU) 12 for controlling its three functional parts, that is, a raindrop sensor 15, a fogging limiting part and a temperature characteristic data storing part.

The raindrop sensor 15 is for optically detecting raindrops on the front windshield 1. It is comprised of a light emitting diode (LED) 8, a photo diode 9, an LED drive circuit 13 and wave-detector and amplifier circuit 14. The raindrop sensor 15, particularly the LED 8 and the diode 9, is attached to an interior surface of the front windshield 1 by a transparent adhesive or the like. In the raindrop detecting operation, the CPU 12 controls the LED drive circuit 13 to drive the LED 8 to emit light. The CPU 12 receives an output signal of the photo diode 9 after wave-detection and amplification by the wave-detector and amplifier circuit 14. It is preferred to use a number of raindrop sensors for improving accuracy of raindrop detection.

The fogging limiting part is for limiting fogging of a prism (not shown) interposed between the LED 8 and the photo diode 9. It is comprised of a prism heater 20, a heater drive circuit 21 and a prism temperature sensor 22. The CPU 12 receives a prism temperature detection signal from the temperature sensor 22 and feedback-controls the heater drive circuit 21 to maintain the prism at a predetermined temperature for defogging.

The temperature characteristic data storing part is comprised of a temperature sensor 10 and an EEPROM 11 which is a rewritable non-volatile memory. The temperature sensor 10 is disposed to detect ambient temperature of the raindrop sensor 15. The EEPROM 11 stores the detected ambient temperature data and the detection output data of the raindrop sensor 15 in correspondence with the detected ambient temperature data.

In operation, the raindrop detecting apparatus 6 is rendered operative when the wiper switch 7 is turned to the auto mode position (AUTO) among four mode positions, that is, stop mode (OFF), low speed mode (LO), high speed mode (HI) and auto mode (AUTO). If the raindrop detecting apparatus 6 detects raindrops, it automatically starts driving the wiper motor 4 through the motor drive circuit 5.

In the raindrop detecting apparatus 6, the drive circuit 13 drives the LED 8 to emit light toward the prism so that the emitted light passes the prism, totally reflects on an exterior surface of the windshield 1 and reaches the photo diode 9. If raindrops stick to the exterior of the front windshield 1, the emitted light passes through the raindrop-wetted area without total internal reflection thereat. As a result, the amount of light reflected at the windshield and received by the photo diode 9 decreases. The raindrop detecting apparatus 6, particularly the CPU 12 detects raindrops in response to decrease in the reflected light and drives the wiper motor 4 through the drive circuit 5.

The raindrop sensor 15 of each detecting apparatus 6 has its own temperature-dependent characteristic different from those of other apparatus units of the same type. Due to this different temperature characteristic, each detecting apparatus 6 suffers that the amount of light emitted by the LED 8 and the output signal of the wave-detector and amplifier circuit 14 vary with temperature changes from unit to unit.

The apparatus 6 detects raindrops by comparing the output signal of the wave-detector and amplifier circuit 14 with a raindrop detection threshold. The raindrop detection threshold is calculated by using temperature characteristic data which is defined by a plurality of (three) data of temperature detected by the temperature sensor 10 and data of output produced by the raindrop sensor 15. This raindrop detection threshold is determined in the following three stages.

The first stage is executed when the apparatus 6 is produced and checked for operation before shipment for installation in a vehicle. In this stage, a reference temperature is set, and the output signal produced by the raindrop sensor 15 at this reference temperature is measured as a reference output data. Then ambient temperature is changed to two temperatures different from the reference temperature, and the output signals produced by the raindrop sensor 15 at these two different temperatures are measured, respectively. The rate of each output data to the reference output data is calculated as the output rate data. This output rate data are stored as temperature characteristic data (first data).

Figure 2:
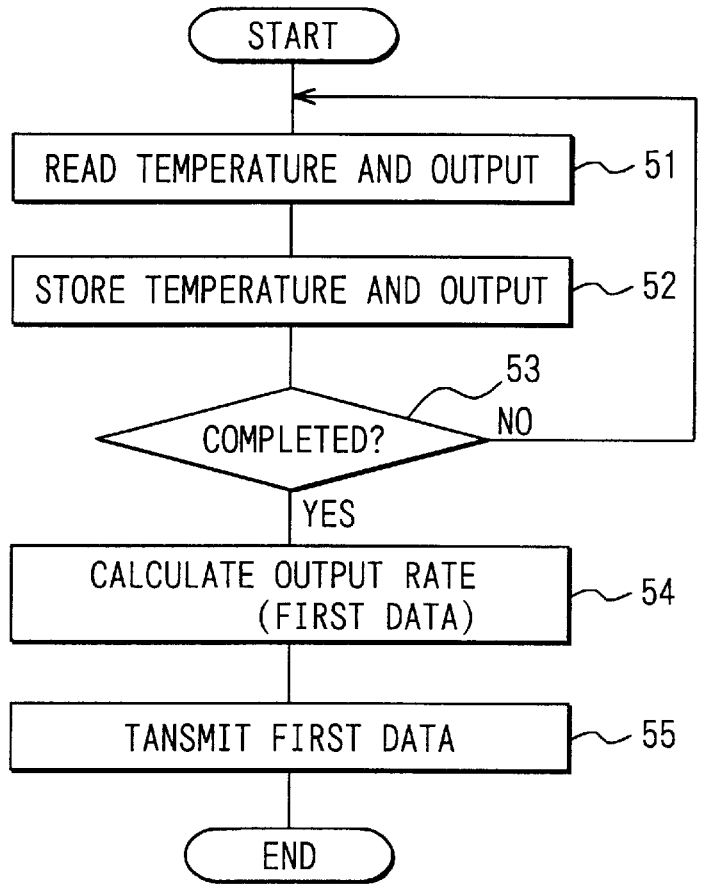
FIG. 2 is a flow diagram showing a process of storing temperature characteristic data before shipment of the raindrop detecting apparatus shown in FIG. 1.

The first stage process is executed by a computer of the test bench as shown in FIG. 2. In this process, the raindrop detecting apparatus 6 is mounted on the test bench which has a simulated windshield and is capable of varying ambient temperatures. This windshield has no-raindrops thereon. The ambient temperature is set to the reference temperature 10° C., for instance, and the apparatus 6 is set operative. Under this condition, the temperature data of the temperature sensor 10 and the output data of the raindrop sensor 15 are read at step 51 and stored at step 52.

Then the ambient temperature is changed to 25° C. and 40° C. Under each temperature condition, the temperature data of the temperature sensor 10 and the output data of the raindrop sensor 15 are read and stored in the same manner as at steps 51 and 52. If all the data at three temperatures are stored (step 53: YES), the temperature data 25° C. intermediate the other two temperatures 10° C. and 40° C. is defined as the reference temperature, and the output data of the raindrop sensor 15 read at 25° C. is defined as the reference output data. The rates of the output data of the raindrop sensor 15 read at 10° C. and 40° C. relative to the reference output data at the reference temperature data 25° C. are calculated, respectively, at step 54. This temperature characteristic data comprising two output rate data is transmitted as the first data to be stored in the EEPROM 11 of the apparatus 6 at step 55.

Figure 6:
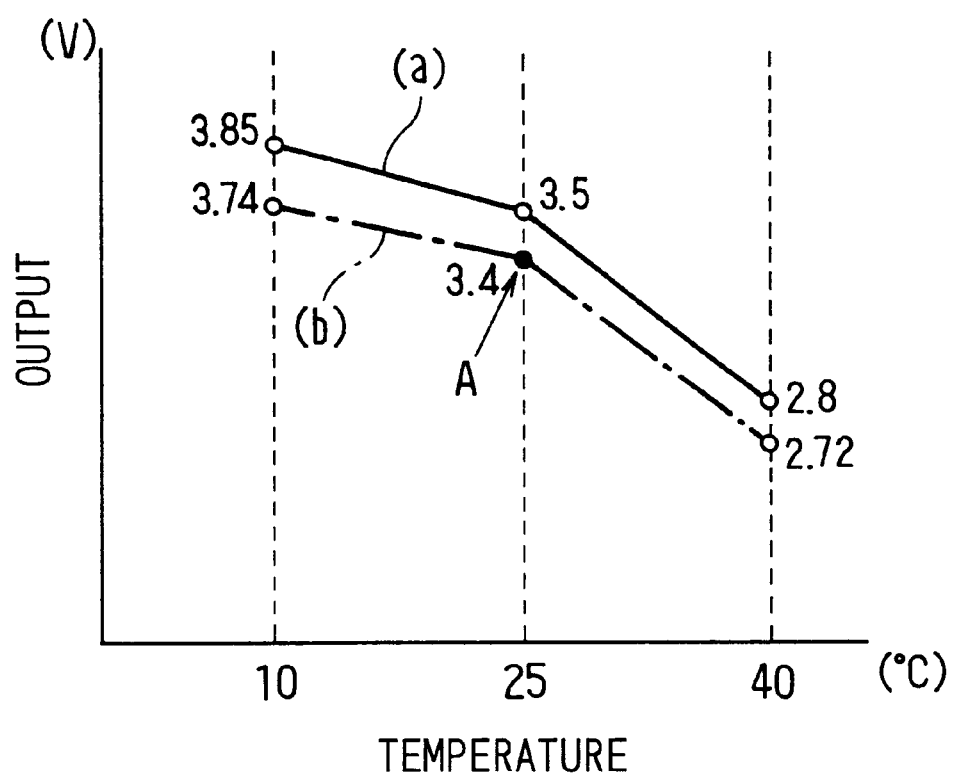
FIG. 6 is a characteristic diagram showing a relation between ambient temperature and a raindrop sensor output.

The temperature characteristic of the raindrop sensor 15 of the apparatus 6 defined in the first stage process is shown by a characteristic curve (a) in FIG. 6. FIG. 6 shows that the output data of the raindrop sensor 15 are 3.85V, 3.5V and 2.8V when the ambient temperature data of the temperature sensor 10 are 10° C., 25° C. and 40° C., respectively. From this characteristic curve (a), the output rate data (first data) are calculated as follows.

The output rate of 10° C. relative to the reference temperature 25° C. is calculated as 1.1 (=3.85/3.5), and the output rate of 40° C. relative to the reference temperature 25° C. is calculated as 0.8 (=2.8/3.5). The temperature characteristic below 10° C. is calculated by extrapolation using the characteristic curve between 10° C. and 25° C., and the temperature characteristic above 40° C. is calculated by extrapolation using the characteristic curve between 25° C. and 40° C.

The above process is executed for each raindrop sensor in the similar manner, if a plurality of raindrop sensors is incorporated in the apparatus 6. A plurality of output rate data calculated by varying the ambient temperature to three temperature points represent the output characteristic change and enable the temperature-dependent compensation of the raindrop sensor 15 over a wide temperature range. It is of course possible to use only one output rate data to compensate the temperature characteristic data as long as the output rate data covers the central temperature point in the normal range of temperature to which the apparatus 6 is subjected. In this process, the output rate data stored as the temperature characteristic data in the EEPROM 11 is defined as the rate of output relative to that of the reference temperature 25° C. As a result, the volume of data is reduced in comparison with the case in which the temperature characteristic data is defined by using both the temperature data of the temperature sensor 10 and the output data of the raindrop sensor 15. Further, the storage capacity of the EEPROM 11 required for the temperature characteristic data is reduced, and the calculation speed of CPU 12 is improved due to reduction in data. In addition, the apparatus 6 can be rejected from shipment, when the temperature characteristic data calculated by the test bench exceeds a tolerable range.

The second stage is executed when the apparatus 6 is installed on the front windshield 1. In this stage, the ambient temperature of the temperature sensor 10 is measured as a second temperature data, and the output signal of the raindrop sensor 15 is measured as a second output data. These two measured second data are stored so that a raindrop detection threshold (second data) is calculated from the two measured second data and the output rate data (first data).

Figure 3:
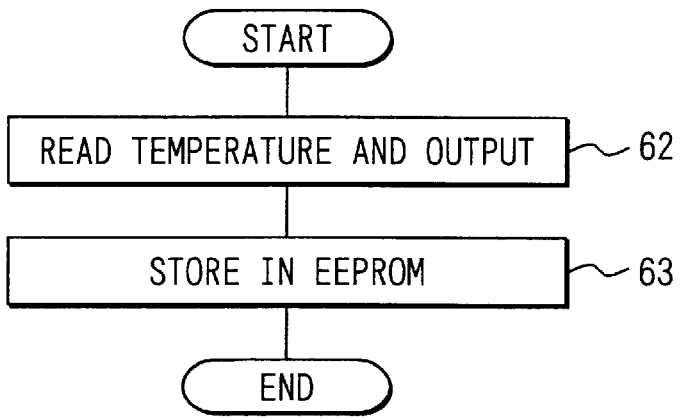
FIG. 3 is a flow diagram showing a process of storing a raindrop detection threshold when the raindrop detecting apparatus is installed in a vehicle.

The second stage process is executed by the CPU 12 of the apparatus 6 as shown in FIG. 3 after installation in the vehicle. As the apparatus 6 is usually installed in the vehicle inside a vehicle manufacturing factory, that is, under a roof, the windshield 1 has no-raindrops. When the engine is started by turning on the ignition switch 40 with the apparatus 6 being rendered operative, the process starts. The temperature data of the temperature sensor 10 and the output data of the raindrop sensor 15 are read as the second temperature data and the second output data at step 62. These data are stored in the EEPROM 11 as the second data of the raindrop detection threshold at step 63.

According to the second stage process, the temperature data of the temperature sensor 10 is assumed to be the same as the temperature data (25° C.) in the first stage process, and the output data is assumed to be 3.4V. This point is shown by A in FIG. 6 as the second data. Using this second data and the output rate data (first data), the raindrop detection threshold is determined as the curve (b) as shown in FIG. 6. Specifically, this curve (b) defines that the output data are 3.74V (=3.4V×1.1) at 10° C. and 2.72V (=3.4V×0.8) at 40° C. With this second data, the wiper system is enabled to operate immediately after production of the vehicle.

The third stage is executed periodically, for instance, at every starting of an engine of the vehicle or at every fixed time interval. In this stage, the ambient temperature of the temperature sensor 10 is measured, and the output signal of the raindrop sensor 15 is measured. These two measured data are corrected by using the output rate data (first data), and the raindrop detection threshold (second data) is updated or replaced with the corrected output data and stored.

Figure 4:
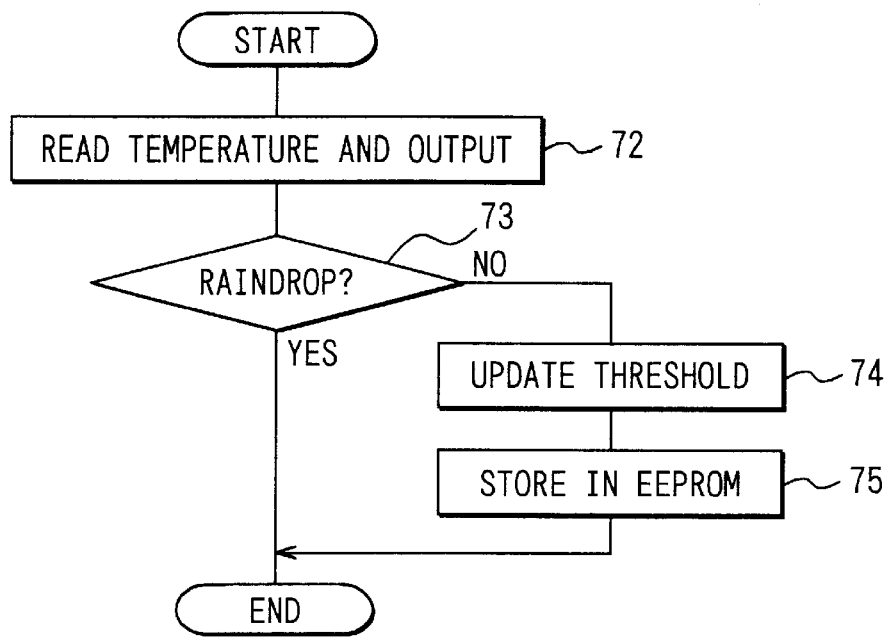
FIG. 4 is a flow diagram showing a process of updating the raindrop detection threshold while the raindrop detecting apparatus is used in the vehicle.
Figure 5:
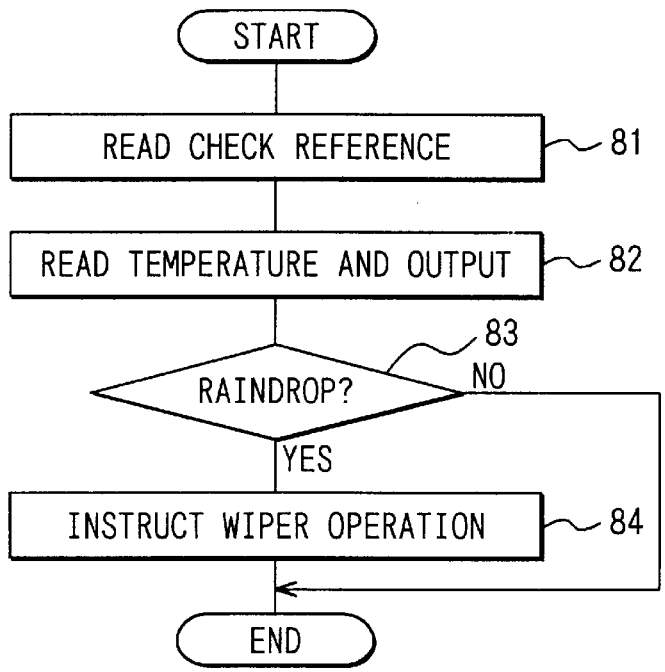
FIG. 5 is a flow diagram showing a process of detecting raindrops executed while the raindrop detecting apparatus is in operation.

The third stage process is executed as shown in FIG. 4 by the CPU 12. When the ignition switch 40 is turned on to start engine operation, the process starts. The temperature data of the temperature sensor 10 and the output data of the raindrop sensor 15 are read at step 72. With this data and the raindrop detection threshold (second data), it is checked at step 73 whether there are raindrops. This checking step 73 is shown in FIG. 5 in detail. Only when this check result is NO because of no-raindrops, the raindrop detection threshold (second data) is updated or replaced at step 74 with the temperature data and the output data read at step 72, and the updated threshold is stored in the EEPROM 75.

According to this third stage process, the raindrop detection threshold is always compensated also for aging changes of the LED 8, photo diode 9, LED drive circuit 13 and the wave-detector and amplifier circuit 14 as well as varying conditions (dust or the like) of the windshield surface.

The apparatus 6 continues to operate as shown in FIG. 5 by the operation of CPU 12 after the updating process at each engine starting, as long as the ignition switch 40 is held turned on. The latest raindrop detection threshold is read from the EEPROM 11 at step 81. The current temperature data of the temperature sensor 10 and the current output data of the raindrop sensor 15 are read at step 82. Using these data, a raindrop detection is made at step 83. If the check result at step 83 is YES indicating raindrops, the wiper operation is initiated automatically.

In the raindrop detection at step 83, the output data of the raindrop sensor 15 is compared with the raindrop detection threshold. For instance, the rate of drop of the output data of the circuit 14 is calculated because the output data falls in response to raindrops, and the relation of the drop rate is compared with the raindrop detection threshold. The drop rate corresponds to the output data rate of the raindrop sensor 15 relative to the raindrop detection threshold. This raindrop detection operation is discussed further in detail with reference to FIG. 6.

It is assumed that the current temperature data of the temperature sensor 10 is 10° C. and the current output data of the raindrop sensor 15 is 3.74V. This output data is converted to a corresponding value of 25° C. by using the output data rate (1.1). This conversion results in 3.4V (=3.74/1.1). Because the raindrop detection threshold (second data) is 3.4V, the output drop is 0% [=(1−3.4/3.4)×100]. This condition is determined to be no-raindrop by setting the threshold drop to be 2%. These data, 3.74V at 10° C., are stored in the EEPROM 11 as the second data to update the second data.

It is assumed next that the temperature data is 40° C. and the output data is 2.6V. This output data is converted to a corresponding value of 25° C. by using the output data rate (0.8). This conversion results in 3.25V (=2.6/0.8). The latest raindrop detection threshold (second data), 3.74V at 10° C., is converted to a corresponding value of 25° C. This conversion results in 3.4V (=3.74/1.1). As a result, the output drop is 4.4% [=(1−3.25/3.4)×100]. This condition is determined to be raindrop by setting the threshold drop to be 2%.

The present invention should not be limited to the disclosed embodiment, but may be modified in many ways. For instance, the raindrop sensor may be a capacitive-type, ultrasonic-type or the like other than the above optical-type. The first stage process (FIG. 2) may be executed by the CPU 12 of the apparatus 6 in place of the computer of the test bench. The temperature characteristic data (first data) shown by the curve (a) in FIG. 6 may be calculated by using only two temperature data.

What is claimed is:

1. A raindrop detecting method comprising:

storing a characteristic data of a raindrop sensor as a comparison reference, all of the characteristic data being indicative of a temperature-dependent output characteristic of the raindrop sensor under a no-raindrop condition; and detecting a raindrop by comparing an output data of the raindrop sensor produced from time to time and the stored characteristic data.

2. The raindrop detecting method according to claim 1, further comprising:

updating the stored characteristic data in accordance with varying conditions of the raindrop sensor.

3. The raindrop detecting method according to claim 2, further comprising:

converting the stored characteristic data to a data which corresponds to a temperature at which the output data is produced, so that the detecting of the raindrop involves detecting the raindrop based on a deviation of the output data from the converted characteristic data.

4. The raindrop detecting method according to claim 1, further comprising:

determining the temperature-dependent output characteristic from a plurality of initial output data of the raindrop sensor produced under a no-raindrop condition before the raindrop sensor is installed in a vehicle; and converting the latest stored characteristic data under a no-raindrop condition and the current output data based on the determined temperature-dependent output characteristic, so that the detecting of the raindrop involves comparing two data of the latest stored characteristic data and the current output data to detect the raindrop under a same temperature condition.

5. The raindrop detecting method according to claim 4, further comprising:

updating the stored characteristic data in accordance with another output data of the raindrop sensor each time an engine of the vehicle is started or at a predetennined period.

6. The raindrop detecting method according to claim 5, wherein updating the stored characteristic data is executed only under a no-raindrop condition on the raindrop sensor.

7. The raindrop detecting method according to claim 1,
wherein reading, before the raindrop sensor is installed on a vehicle, a plurality of initial output data of the raindrop sensor and a plurality of initial temperature data indicative of temperatures at which the initial output data are produced; and
calculating a rate of change in the initial output data with respect to temperature, so that storing the characteristic data involves storing the calculated rate as a part of the characteristic data.

8. The raindrop detecting method according to claim 7,
storing, when the raindrop sensor is installed on the vehicle, another output data of the raindrop sensor and another temperature data indicative of a temperature at which the another output data is produced as another part of the characteristic data.

9. The raindrop detecting method according to claim 8, further comprising:
updating, each time an engine of the vehicle is started, the stored another output data of the raindrop sensor and the stored another temperature data by a further output data of the raindrop sensor and a further temperature indicative of a temperature at which the further output data is produced.

10. The raindrop detecting method according to claim 9,
wherein the updating includes further updating the stored output data and the stored temperature data by the output data and the temperature data which are used in the detecting of the raindrop.

11. The raindrop detecting method according to claim 1, wherein the stored characteristic data is stored before shipment of the raindrop sensor.

12. The raindrop detecting method according to claim 1, wherein the stored characteristic data is stored after shipment of the raindrop sensor.

13. A raindrop detecting apparatus comprising:
a raindrop sensor disposed to sense a raindrop and produce an output data indicative of the sensed raindrop;
a temperature sensor disposed to sense a temperature around the raindrop sensor and produce a temperature data indicative of the sensed temperature;
a memory for storing all of the characteristic data as a comparison reference that includes the temperature data and the output data corresponding to the temperature data, which are produced under a no-raindrop condition; and
a processor for detecting a raindrop by comparing a current output data of the raindrop sensor produced from time to time with the latest stored characteristic data.

14. The raindrop detecting apparatus according to claim 13,
wherein the stored characteristic data includes an output rate data indicative of an output rate of the output data of the raindrop sensor relative to a reference output data of the raindrop sensor produced at a reference temperature.

15. The raindrop detecting apparatus according to claim 14,
wherein a temperature-dependent output rate data is calculated by a plurality of temperature data of the temperature sensor and a plurality of output data of the raindrop sensor produced at temperatures of the plurality of temperature data.

16. The raindrop detecting apparatus according to claim 15,
wherein the output rate data is stored in the memory before installation of the raindrop sensor.

17. The raindrop detecting apparatus according to claim 16,
wherein the stored characteristic data is updated to a second temperature data of the temperature sensor and a second output data of the raindrop sensor produced in correspondence with the second temperature data; and
the second temperature data and the second output data are produced and updated after the temperature sensor and the raindrop sensor are installed in a vehicle.

18. The raindrop detecting apparatus according to claim 16,
a no-raindrop detection criterion setting part for setting a no-raindrop detecting output level at a certain temperature from the stored temperature-dependent output rate data, a second temperature data of the temperature sensor produced under a no-raindrop condition and a second output data of the raindrop sensor produced in correspondence with the temperature data under a no-raindrop condition; and
a raindrop detecting part for detecting a raindrop by converting a current output data of the raindrop sensor to an output data at a certain temperature in order to compare with a no-raindrop detecting output level for comparison under a same temperature condition.

19. The raindrop detecting apparatus according to claim 13, wherein the memory stores the stored characteristic data before shipment of the raindrop detecting apparatus.

20. The raindrop detecting apparatus according to claim 13, wherein the memory stores the stored characteristic data after shipment of the raindrop detecting apparatus.

21. A raindrop detecting method comprising:
storing a characteristic data, an output data of a raindrop sensor, and a temperature data of a temperature sensor, wherein all of the characteristic data indicates a temperature-dependent characteristic of the raindrop sensor, the output data is produced under a no-raindrop condition and the temperature data is produced at the same time as the output data;
converting an output data of the raindrop sensor produced from time to time into converted output data and the stored output data produced under a no-raindrop condition into convened stored output data so that the output data and the stored output data are compared under a same temperature condition; and
detecting a raindrop by comparing the converted output data and the converted stored output data;
wherein said converting is based on a temperature data produced at the same time as the output data, the stored temperature data and the stored characteristic data.

22. The raindrop detecting method according to claim 21,
wherein detecting the raindrop further includes:
calculating a ratio of the converted output data and the converted stored output data; and
determining the raindrop to adhere to the raindrop sensor when the ratio is below 1.0 and a predetermined ratio.

23. The raindrop detecting method according to claim 22,
wherein the predetermined ratio changes in accordance with a temperature difference between the temperature data and the stored temperature data.

24. The raindrop detecting method according to claim 21,
wherein detecting the raindrop further includes:
calculating a ratio of the converted output data and the converted stored output data;

determining no raindrop to adhere to the raindrop sensor when the ratio is equal to and above 1.0; and updating the stored output and the stored temperature data by the output data and the temperature data.

25. The raindrop detecting method according to claim 21, wherein the stored output data and the stored temperature data are initially stored in such a manner that an initial output data and an initial temperature data are produced at primary energization of the raindrop and temperature sensors after shipment of the raindrop and temperature sensors so that the initial output and temperature data are stored as an initially stored output data and an initially stored temperature data.

26. The raindrop detecting method according to claim 25, wherein detecting the raindrop further includes:

calculating a ratio of the converted output data and the converted stored output data;

determining no raindrop to adhere to the raindrop sensor when the ratio is equal to and above 1.0; and updating the stored output data and the stored temperature data by the output data and the temperature data after the initially stored output data and the initially stored temperature data are stored.

27. The raindrop detecting method according to claim 21, wherein the stored characteristic data is initially stored in such a manner that a plurality of output data of the raindrop sensor at different temperatures are produced just after shipment of the raindrop sensor so that an output ratio data is stored as an initial characteristic data, the output ratio data being produced by a rate of the plurality of output data at different temperatures to a reference output data produced at a predetermined temperature.

28. The raindrop detecting method according to claim 27, wherein the predetermined temperature is 25° C.

29. The raindrop detecting method according to claim 28, wherein detecting the raindrop further includes:

calculating a ratio of the converted output data and the converted stored output data;

determining no raindrop to adhere to the raindrop sensor when the ratio is equal to and above 1.0;

updating the stored output data and the stored temperature data by the output data and the temperature data; and updating the stored output ratio data by a ratio of the output data to the reference output data at 25° C.

30. The raindrop detecting method according to claim 21, wherein the stored characteristic data is initially stored in such a manner that an output ratio data is estimated from a predetermined temperature-dependent characteristic of a raindrop sensor so that the output ratio data is stored as an initial characteristic data, and wherein the output ratio data is a rate of a plurality of output data at different temperatures to an output data at a predetermined temperature.

31. A raindrop detecting apparatus comprising:

a raindrop sensor disposed to sense a raindrop and produce an output data indicative of the sensed raindrop;

a temperature sensor disposed to sense a temperature around the raindrop sensor and produce a temperature data indicative of the sensed temperature;

a memory for storing a characteristic data, an output data of a raindrop sensor, a temperature data of a temperature sensor, wherein all of the characteristic data indicates a temperature-dependent characteristic of the raindrop sensor, the output data is produced under a no-raindrop condition and the temperature data is also produced at the same time as the output data; and a processor for converting an output data produced from time to time into converted output data and the stored output data produced under a no-raindrop condition into converted stored output data so that the output data and the stored data are compared under a same temperature condition, and for detecting a raindrop by comparing the convened output data and the converted stored output data, wherein the converting is based on a temperature data produced at the same time as the output data, the stored temperature data and the stored characteristic data.

* * * * *

UNITED STATES PATENT AND TRADEMARK OFFICE
CERTIFICATE OF CORRECTION

PATENT NO. : 6,686,992 B2
DATED : February 3, 2004
INVENTOR(S) : Wakabayashi et al.

It is certified that error appears in the above-identified patent and that said Letters Patent is hereby corrected as shown below:

Title page,
Item [56], References Cited, U.S. PATENT DOCUMENTS , please add the following:
-- 2002/0126015    9/2002   Ishikawa --.

Signed and Sealed this

Twenty-ninth Day of June, 2004

JON W. DUDAS
*Acting Director of the United States Patent and Trademark Office*